(12) United States Patent
Tsuchida et al.

(10) Patent No.: US 8,283,915 B2
(45) Date of Patent: Oct. 9, 2012

(54) SENSOR MAGNET DEVICE, GEAR MECHANISM AND SPEED REDUCING ELECTRIC MOTOR

(75) Inventors: Masumi Tsuchida, Toyokawa (JP); Akio Oshiro, Hamamatsu (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 966 days.

(21) Appl. No.: 12/071,926

(22) Filed: Feb. 28, 2008

(65) Prior Publication Data

US 2008/0218160 A1 Sep. 11, 2008

(30) Foreign Application Priority Data

Mar. 7, 2007 (JP) ................................ 2007-057621
Mar. 7, 2007 (JP) ................................ 2007-057622
Jul. 11, 2007 (JP) ................................ 2007-182538

(51) Int. Cl.
*G01B 7/30* (2006.01)
(52) U.S. Cl. ................... 324/207.25; 310/68 B
(58) Field of Classification Search ............ 324/207.25
See application file for complete search history.

(56) References Cited

U.S. PATENT DOCUMENTS

| 6,359,432 | B1* | 3/2002 | Okumura | 324/207.2 |
| 6,577,121 | B1* | 6/2003 | Adelerhof et al. | 324/207.21 |
| 6,703,732 | B2* | 3/2004 | Grass | 310/75 R |
| 7,159,688 | B2 | 1/2007 | Onizuka et al. | |
| 7,294,986 | B2 | 11/2007 | Marentette | |
| 7,426,978 | B2 | 9/2008 | Onizuka et al. | |
| 2004/0066187 | A1* | 4/2004 | Schroter et al. | 324/207.22 |
| 2005/0217923 | A1 | 10/2005 | Onizuka et al. | |
| 2006/0196294 | A1 | 9/2006 | Berge | |
| 2006/0226802 | A1 | 10/2006 | Marentette | |
| 2007/0080016 | A1 | 4/2007 | Onizuka et al. | |

FOREIGN PATENT DOCUMENTS

| DE | 1 563 009 | 5/1970 |
| JP | A-2004-135403 | 4/1930 |
| JP | A-4-306152 | 10/1992 |
| JP | A-H9-311053 | 12/1997 |
| JP | A-2004-153984 | 5/2004 |
| JP | A-2004-254455 | 9/2004 |
| JP | A-2005-94821 | 4/2005 |
| JP | A-2008-206354 | 9/2008 |

OTHER PUBLICATIONS

Partial European Search Report mailed on Mar. 18, 2009 issued from the European Patent Office in the corresponding European patent application No. 08003894.6-2207.
Extended European Search Report mailed on Nov. 9, 2009 issued from the European Patent Office in the corresponding European patent application No. 08003894.6-2207.
Extended European Search Report mailed on Feb. 4, 2011 issued from the European Patent Office in corresponding European patent application No. 10015904.5.
Notification of Reason(s) for Refusal mailed Oct. 4, 2011 in corresponding JP application No. 2007-57621 (and English translation).

* cited by examiner

*Primary Examiner* — Jay Patidar
*Assistant Examiner* — David M. Schindler
(74) *Attorney, Agent, or Firm* — Posz Law Group, PLC

(57) ABSTRACT

In a speed reducing electric motor, a speed reducing gear unit has a sensor magnet device, which is fixed to a worm wheel and includes an inner ring magnet, an outer ring magnet and connecting portions. The inner ring magnet is placed along a predetermined first imaginary circle. The outer ring magnet is placed along a predetermined second imaginary circle, which is coaxial with the first imaginary circle and has a diameter that is smaller or larger than that of the first imaginary circle. The connecting portions connect between the inner ring magnet and the outer ring magnet. The sensor magnet device is fixed to the worm wheel by a magnet fixing structure.

14 Claims, 12 Drawing Sheets

SENSOR MAGNET DEVICE, GEAR MECHANISM AND SPEED REDUCING ELECTRIC MOTOR

CROSS REFERENCE TO RELATED APPLICATION

This application is based on and incorporates herein by reference Japanese Patent Application No. 2007-57621 filed on Mar. 7, 2007, Japanese Patent Application No. 2007-57622 filed on Mar. 7, 2007 and Japanese Patent Application No. 2007-182538 filed on Jul. 11, 2007.

BACKGROUND OF THE INVENTION

1. Field of the Invention

The present invention relates to a sensor magnet device, a gear mechanism and a speed reducing electric motor.

2. Description of Related Art

The present invention relates to a sensor magnet device, a gear mechanism and a speed reducing electric motor.

A known speed reducing electric motor includes a speed reducing mechanism, which is formed as a unit that includes a worm speed reducing mechanism connected to a motor main body. An annular magnet, which serves as a sensing subject of a rotational position sensor (magnetic sensor), is coaxially fixed to a worm wheel of the worm speed reducing mechanism, which rotates together with an output shaft. Such a speed reducing electric motor is disclosed in, for example, Japanese Unexamined Patent Publication No. 2005-94821. According to the technique disclosed in this publication, the magnet is rotated together with the output shaft. A magnetic pole change, which is made by a characteristic magnetic pole pattern of the magnet, is sensed with a Hall IC to determine a rotational position of the output shaft.

However, the magnet of the above technique is merely configured into a simple annular body, so that there is still a need for improving the magnet to sense a greater amount of information about a rotational position (rotational state) of the output shaft to increase a sensing accuracy of the rotational position sensor.

Furthermore, the magnet of the above technique is fixed to the worm wheel by bonding the magnet to the worm wheel with a bonding agent, by snap-fitting claws of the worm wheel to a peripheral surface of the magnet or by welding a portion of the worm wheel upon installation of the magnet to the worm wheel to limit unintentional removal of the magnet. The first two methods, i.e., the bonding and the snap-fitting have the disadvantages discussed in Japanese Unexamined Patent Publication No. 2005-94821. Furthermore, heat generated at the time of welding of the portion of the worm wheel may possibly cause a deformation of the worm wheel and/or the magnet (particularly in a case of a bond magnet). The deformation of the gear and/or the magnet may possibly cause an error in a measurement of the rotational position sensor to deteriorate the sensing accuracy of the rotational position sensor.

SUMMARY OF THE INVENTION

The present invention addresses the above disadvantage. Thus, it is an objective of the present invention to provide a sensor magnet device, which enables a magnetic sensor to relatively accurately sense a greater amount of information about a rotational state of a sensing subject. It is another objective of the present invention to provide a gear mechanism having such a sensor magnet device. It is a further objective of the present invention to provide a speed reducing electric motor having such a gear mechanism.

To achieve the objectives of the present invention, there is provided a sensor magnet device, which includes at least one primary magnet portion, at least one secondary magnet portion and at least one connecting portion. The at least one primary magnet portion is placed along a predetermined first imaginary circle. The at least one secondary magnet portion is placed along a predetermined second imaginary circle, which is coaxial with the first imaginary circle and has a diameter that is smaller or larger than that of the first imaginary circle. The at least one connecting portion connects between the at least one primary magnet portion and the at least one secondary magnet portion.

To achieve the objectives of the present invention, there is also provided a gear mechanism, which includes a gear, the above-described sensor magnet device and a fixing means. The gear transmits rotation to an output shaft. The sensor magnet device is placed at one axial end side of the gear and is formed such that the sensor magnet device causes an external magnetic sensor to directly or indirectly sense a rotational state of the output shaft. The fixing means is for fixing the sensor magnet device to the gear. The fixing means includes at least one through hole, at least one fixing protrusion and at least one fixing element. The at least one through hole extends through one of the gear and the sensor magnet device in an axial direction of the output shaft. The at least one fixing protrusion protrudes from the other one of the gear and the sensor magnet device in the axial direction and is respectively received through the at least one through hole in the axial direction. The at least one fixing element is respectively securely installed to a protruding distal end portion of the at least one fixing protrusion, which respectively protrudes from the at least one through hole, in the axial direction, so that the sensor magnet device is coaxially and integrally rotatably fixed to the gear. The sensor magnet device of the gear mechanism may be replaced with another sensor magnet device that includes a magnetic material and is magnetized to have at least one predetermined magnetizing pattern. The sensor magnet device is placed at one axial end side of the gear and is formed such that the sensor magnet device causes an external magnetic sensor to directly or indirectly sense a rotational state of the output shaft.

To achieve the objectives of the present invention, there is also provided a speed reducing electric motor, which includes a motor unit and a speed reducing unit. The speed reducing unit includes the above described gear mechanism. The gear mechanism reduces a rotational speed of rotation transmitted from the motor unit and thereafter conducts the rotation to the output shaft to drive an external driven-side member connected to the output shaft.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A sensor magnet device 100 according to a first embodiment of the present invention will be described with reference to FIGS. 1 to 7. First, a structure of the sensor magnet device 100 alone will be described. Then, a speed reducing electric motor 10 having such a sensor magnet device 100 will be described. Thereafter, advantages of the sensor magnet device 100 will be described.

Figure 1A:
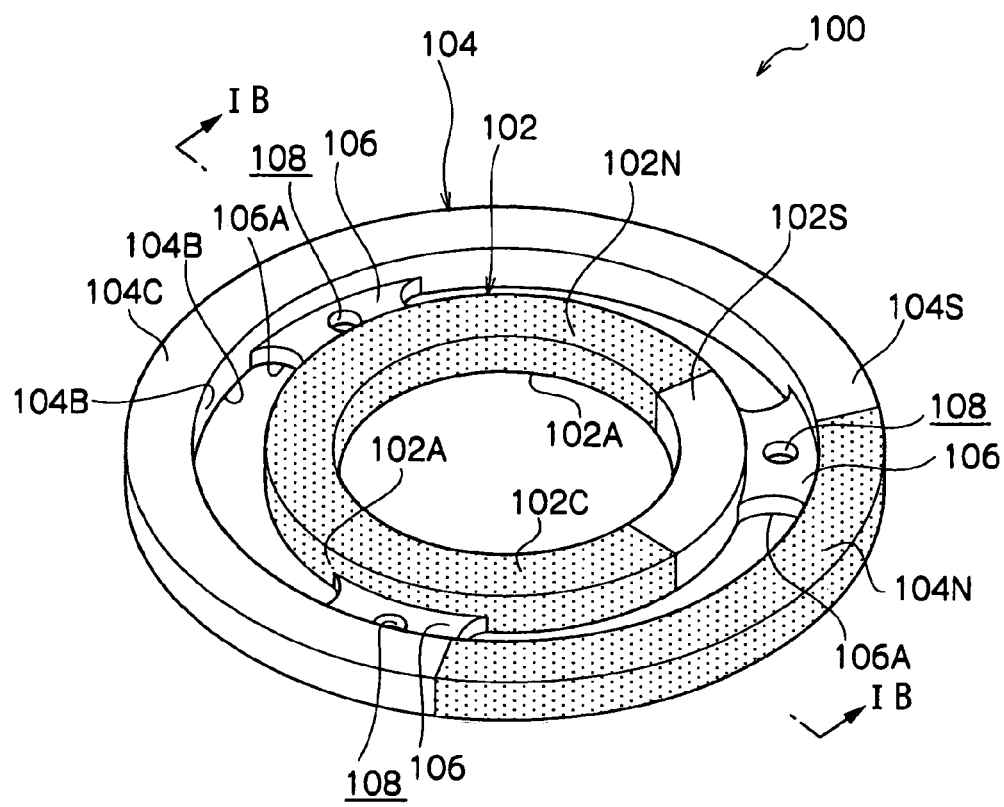
FIG. 1A is a perspective view of a sensor magnet device according to a first embodiment of the present invention.
Figure 1B:
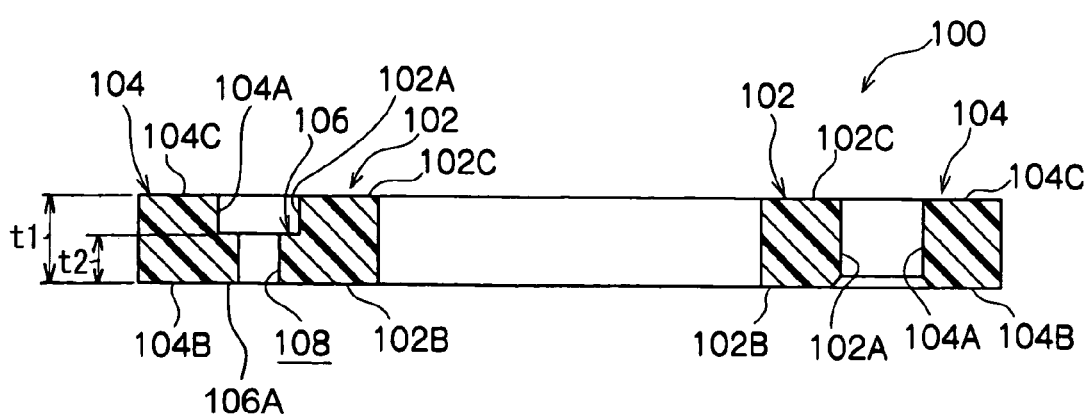
FIG. 1B is a cross sectional view along line IB-IB in FIG. 1A.

As shown in FIGS. 1A and 1B, the sensor magnet device 100 includes an inner ring magnet (serving as a primary magnet portion of the present invention) 102, an outer ring magnet (serving as a secondary magnet portion of the present invention) 104 and connecting portions 106. The connecting portions 106 connect between the inner ring magnet 102 and the outer ring magnet 104. Here, it should be noted that the inner ring magnet 102 and the outer ring magnet 104 may alternately serve as the secondary magnet portion and the primary magnet portion, respectively, of the present invention in some cases.

As shown in FIG. 1A, the inner ring magnet 102 is configured into an annular body, which extends along generally a predetermined imaginary circle. The outer ring magnet 104 is configured as an annular body, which extends along generally another predetermined imaginary circle and has an inner diameter larger than an outer diameter of the inner ring magnet 102. The outer ring magnet 104 and the inner ring magnet 102 are radially connected with each other by the connecting portions 106 such that the outer ring magnet 104 and the inner ring magnet 102 are concentric to each other. As shown in FIG. 1B, the inner ring magnet 102 and the outer ring magnet 104 have generally the same axial thickness t1 and overlap with each other along generally the entire axial thickness thereof in the axial direction.

As shown in FIG. 1A, the connecting portions (three connecting portions in this embodiment) 106 are arranged at generally equal intervals in the circumferential direction of the outer ring magnet 104. The connecting portions 106 connect between the inner ring magnet 102 and the outer ring magnet 104 within the axially overlapped extent, within which the inner ring magnet 102 and the outer ring magnet 104 axially overlap with each other. In other words, the connecting portions 106 are interposed between an outer peripheral surface 102A of the inner ring magnet 102 and an inner peripheral surface 104A of the outer ring magnet 104 and are placed within the extent of the thickness t1 of the inner ring magnet 102 and of the outer ring magnet 104.

As shown in FIG. 1B, each connecting portion 106 has an axial thickness t2, which is smaller than the thickness t1 of each of the inner ring magnet 102 and the outer ring magnet 104. In the present embodiment, each connecting portion 106 is configured such that an axial end surface 106A of the connecting portion 106 in the axial direction of the sensor magnet device 100 is generally flush with an adjacent axial end surface 102B of the inner ring magnet 102 and an adjacent axial end surface 104B of the outer ring magnet 104. Furthermore, each connecting portion 106 has a fitting hole 108, which penetrates through the connecting portion 106 in the thickness direction. The fitting holes 108 of the connecting portions 106 are used to fix the sensor magnet device 100 to a worm wheel 22 (described latter) of the speed reducing electric motor 10.

The sensor magnet device 100, which is configured to have the above dimensions and the shape, is formed such that a center of mass of the sensor magnet device 100 alone coincides with the axis of the sensor magnet device 100.

The inner ring magnet 102 and the outer ring magnet 104 of the sensor magnet device 100 are magnetized as follows. That is, in FIG. 1A, a shaded portion (dotted portion) of the inner ring magnet 102 forms an N-pole 102N, and the rest of the inner ring magnet 102 forms an S-pole 102S. Also, a shaded portion (dotted portion) of the outer ring magnet 104 forms an N-pole 104N, and the rest of the outer ring magnet 104 forms an S-pole 104S. An extent (at least one of a start point and an end point of the extent) of the N-pole 102N of the inner ring magnet 102 in the rotational direction (circumferential direction) differs from an extent (at least one of a start point and an end point of the extent) of the N-pole 104N of the outer ring magnet 104 in the rotational direction (circumferential direction). That is, in the present embodiment, the sensor magnet device 100 is constructed such that a magnetizing pattern of the inner ring magnet 102 in the rotational direction differs from a magnetizing pattern of the outer ring magnet 104 in the rotational direction.

The sensor magnet device 100 is made of plastic magnet (bond magnet), which is prepared by mixing magnetic powder into a resin material. Specifically, in the sensor magnet device 100, the inner ring magnet 102, the outer ring magnet 104 and the connecting portions 106 are integrally molded from the plastic magnet material. The magnetic powder may be selected from, for example, ferrite magnetic power, alnico magnetic powder, neodymium-iron-boron magnetic power and samarium-cobalt magnetic powder. Furthermore, the resin material may be selected from, for example, nylon, polypropylene and polyamide. In the present embodiment, the sensor magnet device 100 is made of the material, which is prepared by adding ferrite magnetic power into nylon.

The other end surface 102C of the inner ring magnet 102, which is opposite from the end surface 102B, and the other end surface 104C of the outer ring magnet 104, which is opposite from the end surface 104B, are opposed to a magnetic sensor 150 (described latter). A magnetic pole change, which is caused by the relative rotation of the sensor magnet device 100 with respect to the magnetic sensor 150, is sensed with the magnetic sensor 150.

Figure 2:
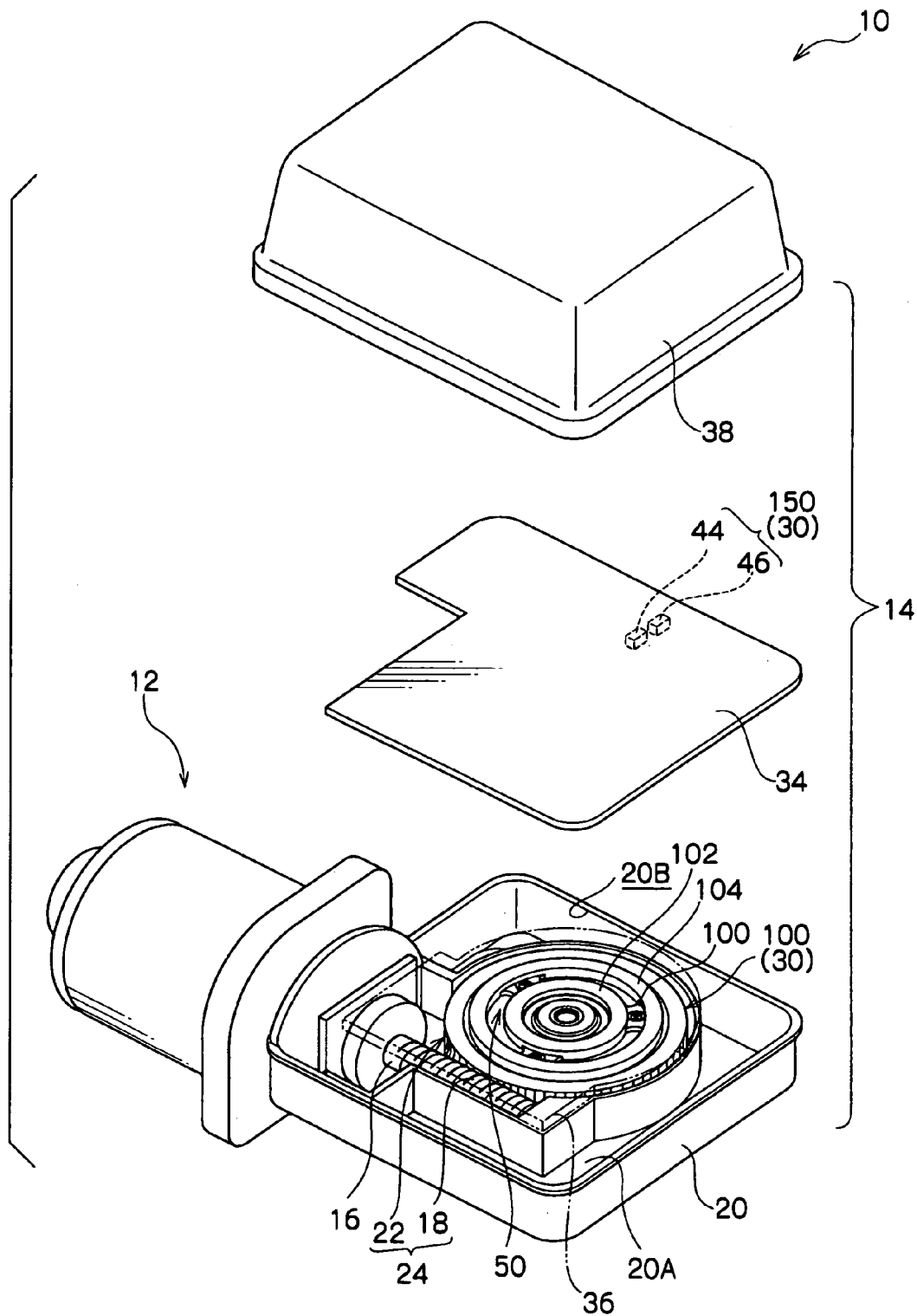
FIG. 2 is an exploded perspective schematic view of a speed reducing electric motor, which includes the sensor magnet device according to the first embodiment.

Now, an example of applying the sensor magnet device 100 to the speed reducing electric motor 10 will be described. As shown in FIG. 2, the speed reducing electric motor 10 includes a motor unit 12 and a speed reducing gear unit 14 (worm speed reducing apparatus), which are assembled together. In the motor unit 12, an armature (not shown) is provided, and a distal end side of a rotatable shaft 16 of the armature protrudes into a housing 20 of the speed reducing gear unit 14. A worm 18 is provided in the housing 20 such that the worm 18 is coaxially and integrally rotated along with the rotatable shaft 16.

Figure 3:
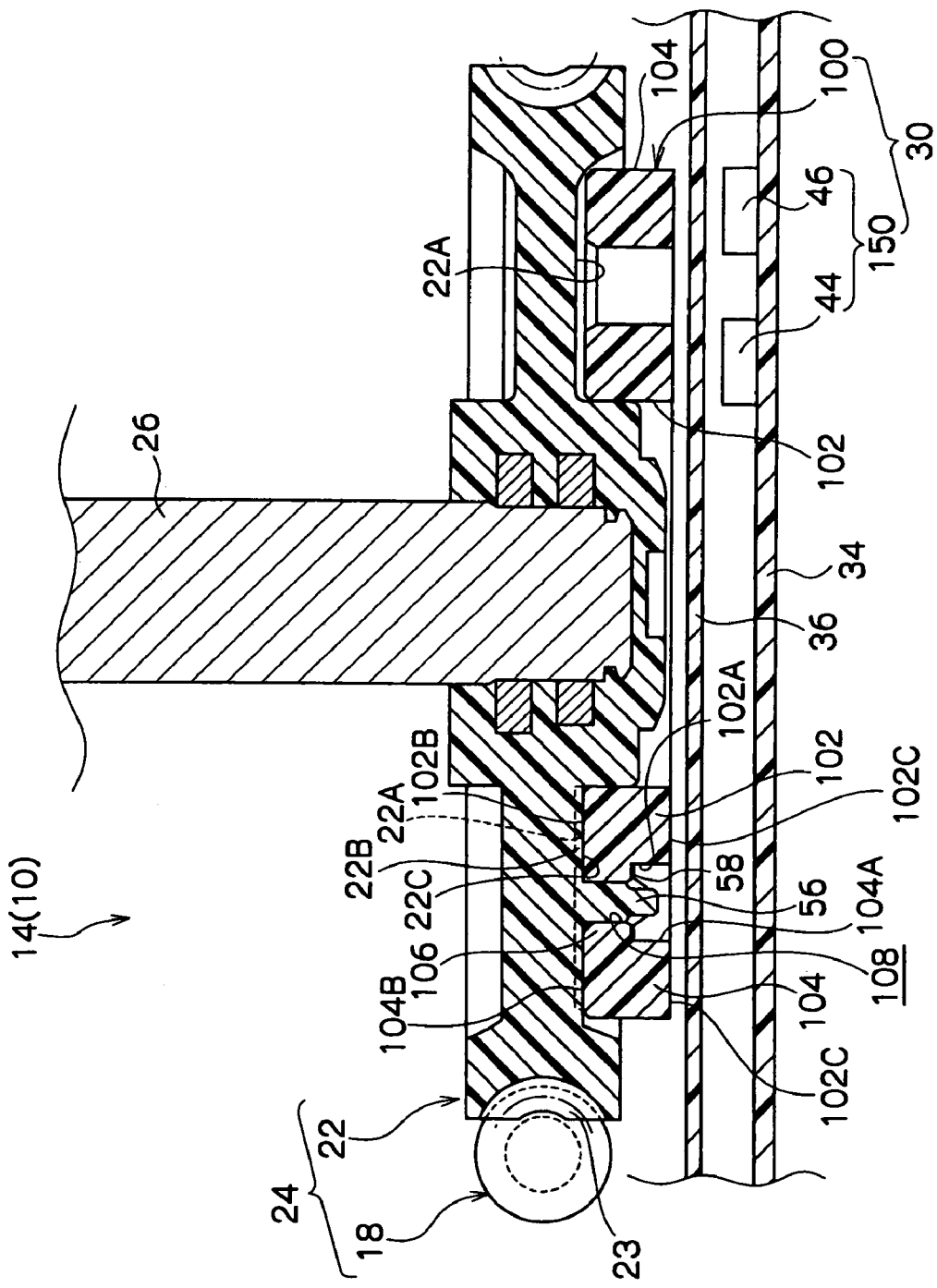
FIG. 3 is a lateral cross sectional view showing a speed reducing gear unit having the sensor magnet device according to the first embodiment.
Figure 5:
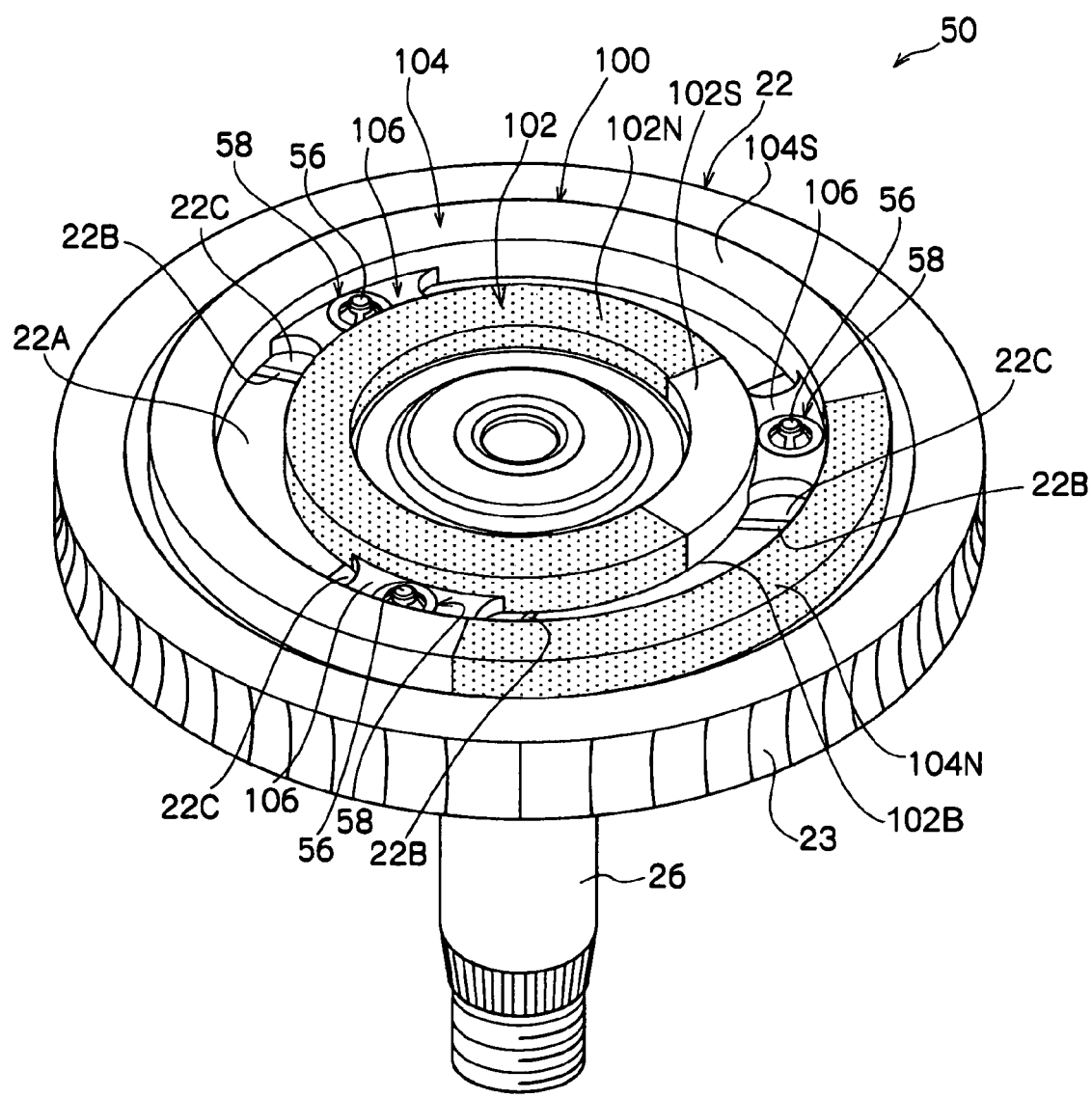
FIG. 5 is a perspective view showing a fixed state of the sensor magnet device to a worm wheel according to the first embodiment.

In the housing 20, the worm 18 is meshed with the worm wheel (serving as a gear of the present invention) 22 and cooperates with the worm wheel 22 to form a worm speed reducing mechanism 24. As shown in FIGS. 3 and 5, the worm wheel 22 is configured into a circular disk body. A toothed portion 23 is provided in an outer peripheral part of the worm wheel 22 to mesh with the worm 18, and an output shaft 26 is coaxially fixed to an axial center of the worm wheel 22 to rotate integrally with the worm wheel 22. In this example, the worm wheel 22 is made of a resin material and is insert molded integrally with one axial end portion of the output shaft 26, which is made of metal.

Although not depicted for the sake of simplicity, the output shaft 26 extends through a bottom plate 20A of the housing 20 and is supported by a bearing in a rotatable manner relative to the housing 20. A protruding distal end portion of the output shaft 26, which protrudes outward from the housing 20, is connected to a driven-side member (a load device) in a manner that enables transmission of a drive force therebetween. With the above construction, in the speed reducing electric motor 10, when the motor unit 12 is driven, rotation (torque) of the motor unit 12 is transmitted to the output shaft 26 through the worm speed reducing mechanism 24 while a speed of the rotation is reduced to increase the torque through the worm speed reducing mechanism 24.

Furthermore, as shown in FIG. 3, a position sensing device 30, which senses a rotational position of the output shaft 26 in its rotating state, is provided to the speed reducing gear unit 14. The position sensing device 30 includes the sensor magnet device 100 and the magnetic sensor 150 as its main components. The sensor magnet device 100 is coaxially fixed to the worm wheel 22 to rotate integrally with the worm wheel 22. The magnetic sensor 150 outputs a signal, which corresponds to the magnetic pole change of the sensor magnet device 100 caused by the rotation of the worm wheel 22.

As shown in FIGS. 3 and 5, the sensor magnet device 100 is fixed to an end portion 22A of the worm wheel 22, which is opposite from the side where the output shaft 26 protrudes. Furthermore, as shown in FIGS. 2 and 3, the magnetic sensor 150 is installed to a circuit board 34, which is fixed to the housing 20. An output signal of the magnetic sensor 150 is outputted to a controller (not shown), which is provided on the circuit board 34.

Also, as shown in FIGS. 2 and 3, an inner cover 36 is interposed between the worm wheel 22 (thereby, the sensor magnet device 100) and the circuit board 34 (thereby, the magnetic sensor 150). The inner cover 36 covers the worm speed reducing mechanism 24 in the housing 20. Furthermore, an outer cover 38 is connected to an opening end 20B of the housing 20. The housing 20 and the outer cover 38 cooperate together to cover (receive) the worm speed reducing mechanism 24, the position sensing device 30 and the circuit board 34 (the controller).

Figure 4:
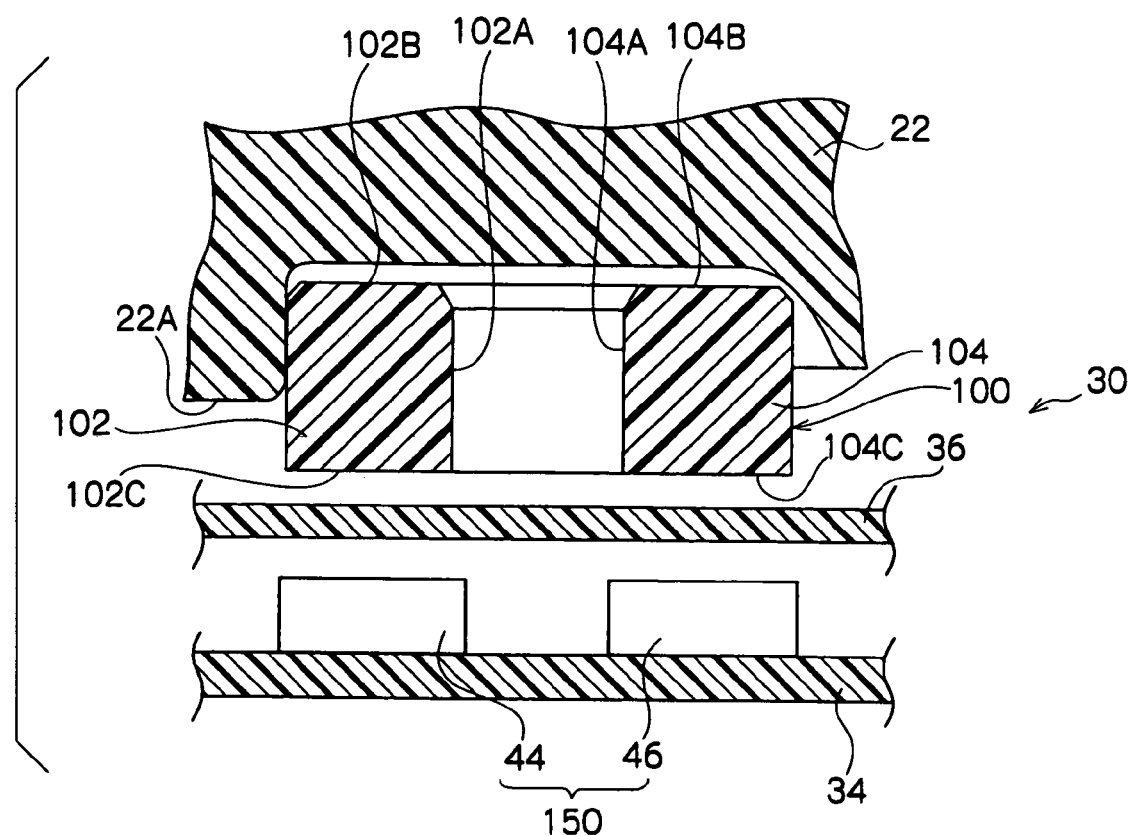
FIG. 4 is an enlarged partial cross sectional view showing a positional relationship between the sensor magnet device and a magnetic sensor according to the first embodiment.

Furthermore, as shown in FIGS. 3 and 4, the position sensing device 30 includes a plurality (two in this example) of Hall elements (or Hall ICs) 44, 46 to correspond with the sensor magnet device 100, which includes the multiple (two) magnetizing patterns, i.e., the inner ring magnet 102 and the outer ring magnet 104. In this example, the Hall elements 44, 46 are arranged one after another along a common imaginary straight line (radial line), which extends from a rotational center of the worm wheel 22 (the sensor magnet device 100).

The Hall element 44 is placed to oppose the axial end surface 102C of the inner ring magnet 102 and outputs the signal, which corresponds to the magnetic pole change caused by the rotation of the inner ring magnet 102. In contrast, the Hall element 46 is placed to oppose the axial end surface 104C of the outer ring magnet 104 and outputs the signal, which corresponds to the magnetic pole change caused by the rotation of the outer ring magnet 104.

A reference position of the position sensing device 30, which includes the inner ring magnet 102, the outer ring magnet 104 and the Hall elements 44, 46, may be set as follows. That is, a position, at which the Hall elements 44, 46 output signals, which respectively correspond to the magnetic pole changes with respect to the S-poles 102S, 104S, may be set as the reference position (e.g., a stop position). Additionally, a position, at which the Hall element 44 outputs a signal that corresponds to the magnetic pole change with respect to the N-pole 102N, may be set as another reference position (e.g., a trigger position).

The above described speed reducing electric motor 10 may be used as a wiper motor, which serves as a drive source of a wiper system, particularly, a wiper motor, which is reciprocally rotated (rotated forward and backward) through a predetermined angular range. In such a case, in the position sensing device 30, for example, the reference position may be set as a lower turning position of a wiper arm. Here, an armature pulse is counted up until the time of reversing the rotational direction of the motor unit 12 (i.e., until the wiper arm reaches an upper turning position thereof), and then the armature pulse is counted down during a downward movement of the wiper arm toward the lower turning position. Furthermore, the trigger position is set as a trigger for initiating forceful setting (forceful correcting) of the counted number of the armature pulse to a predetermined number, which corresponds to a predetermined position of the output shaft (a predetermined position of the wiper).

Next, a magnet fixing structure (serving as a fixing means) 50, which fixes the sensor magnet device 100 to the worm wheel 22 of the speed reducing electric motor 10, will be described.

Figure 6:
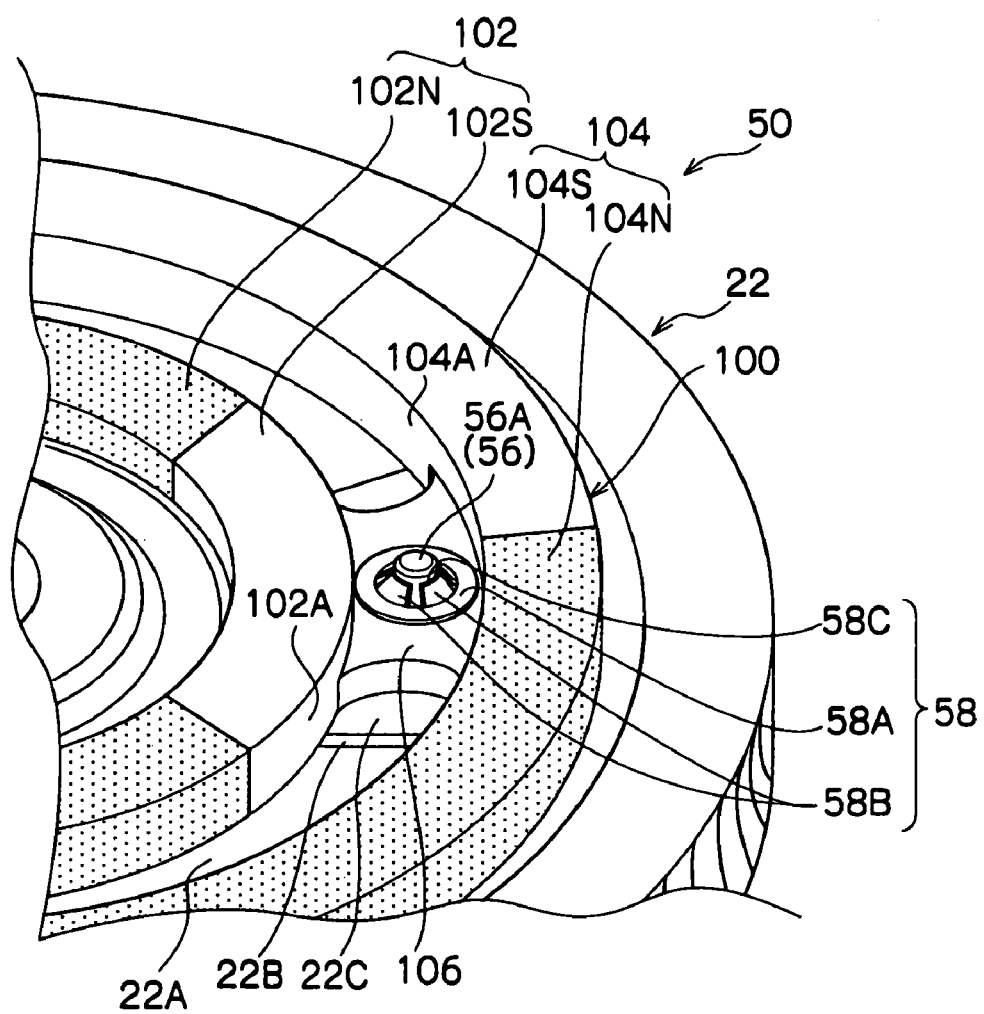
FIG. 6 is an enlarged partial perspective view showing a fixing structure, which fixes the sensor magnet device to the worm wheel according to the first embodiment.
Figure 7:
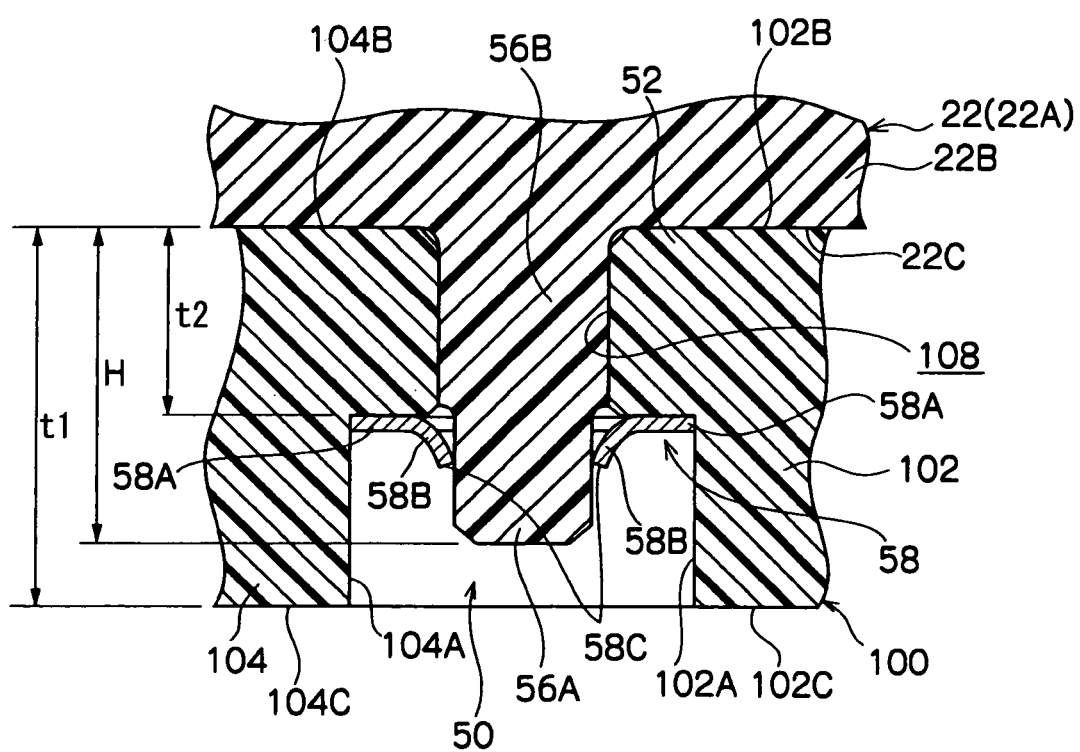
FIG. 7 is an enlarged partial cross sectional view showing the fixing structure, which fixes the sensor magnet device to the worm wheel according to the first embodiment.

The magnet fixing structure 50 is constructed to fix the sensor magnet device 100 to the worm wheel 22 in such a manner that the end surfaces 102B, 104B, 106A of the sensor magnet device 100 contact seat surfaces 22C of protruded seat portions 22B, which are arranged one after another in the circumferential direction at the end portion 22A of the worm wheel 22. As shown in FIGS. 5 to 7, the magnet fixing structure 50 includes the fitting holes 108 of the connecting portions 106 of the sensor magnet device 100, fixing pins (fixing protrusions) 56 of the worm wheel 22 and internal toothed rings 58. Each fixing pin 56 protrudes from the seat surface 22C of a corresponding one of the seat portions 22B of the worm wheel 22, and each toothed ring 58 is securely fitted to a corresponding one of the fixing pins 56. The above structure of the magnet fixing structure 50 will be described in detail.

As shown in FIG. 7, a protruding height H of each fixing pin 56, which is measured from the corresponding seat surface 22C, is set to be smaller than the axial thickness t1 of each of the inner ring magnet 102 and the outer ring magnet 104 and is larger than the axial thickness t2 of each connecting portion 106. A cross sectional area (a circular cross sectional area in this example) of each fitting hole 108 and a cross sectional area (a circular cross sectional area in this example) of the corresponding fixing pin 56 correspond with each other and are configured such that the fixing pin 56 is fitted (lightly press fitted) into the fitting hole 108. In this way, the sensor magnet device 100 has the above described installation position relative to the worm wheel 22. In this installation position, each fixing pin 56, which has the above described protruding height, extends through the fitting hole 108 and thereby through the connecting portion 106 without protruding from the end surface 102C of the inner ring magnet 102 and the end surface 104C of the outer ring magnet 104.

As shown in FIG. 7, in this example, a distal end portion 56A of each fixing pin 56, which protrudes from the corresponding connecting portion 106, has a smaller outer diameter in comparison to an outer diameter of a fitting portion 56B of the fixing pin 56, which is fitted to the fitting hole 108. In the above-described installation position, the distal end portion 56A of the fixing pin 56 is placed between the outer peripheral surface 102A of the inner ring magnet 102 and the inner peripheral surface 104A of the outer ring magnet 104.

Furthermore, as described above, the magnet fixing structure 50 includes the toothed rings 58, each of which serves as a fixing element that is engaged (fitted) to the distal end portion 56A of the fixing pin 56. The toothed ring 58 is engaged with the distal end portion 56A of the corresponding fixing pin 56 in a manner that limits unintentional removal of the fixing pin 56 from the connecting portion 106 (more specifically, from the fitting hole 108).

The structure of each toothed ring 58 will now be described in more detail. As shown in. FIG. 6, the toothed ring 58 has a ring portion 58A and a plurality (for example, four) of teeth 58B. In FIG. 6, the teeth 58B uprightly and inwardly extend in a radial direction of the ring portion 58A from an inner peripheral edge of the ring portion 58A and are arranged one after another at generally equal intervals in a circumferential direction of the ring portion 58A. The teeth 58B are formed by cutting a corresponding annular section, which is located radially inward of the ring portion 58A, into corresponding pieces (serving as the teeth 58B in the final product) and pulling these pieces upwardly, so that the teeth 58B are tilted relative to an axis of the ring portion 58A. The toothed ring 58 is made of a metal material (e.g., spring steel). For example, a well known internal toothed washer may be used as the toothed ring 58, if desired.

The toothed ring 58 is installed to the fixing pin 56 made of the resin as follows. That is, the ring portion 58A is pushed around the fixing pin 56 until the ring portion 58A is seated against the connecting portion 106, so that the distal end portion 56A of the fixing pin 56 is received through an opening located radially inward of the teeth 58B, and radially inner ends 58C of the teeth 58B engage with (bite into) an outer peripheral surface of the distal end portion 56A of the fixing pin 56. In this way, the teeth 58B of the toothed ring 58 radially inwardly clamp the distal end portion 56A of the fixing pin 56 to tightly engage with the distal end portion 56A, so that the unintentional removal of the fixing pin 56 from the connecting portion 106 is advantageously limited by the toothed ring 58. Thereby, the sensor magnet device 100 is fixed to the worm wheel 22 while each connecting portion 106 of the sensor magnet device 100 is clamped between the ring portion 58A of the corresponding toothed ring 58 and the corresponding seat surface 22C of the worm wheel 22.

Furthermore, as described above, the sensor magnet device 100 of the speed reducing gear unit 14 is formed such that the center of mass of the sensor magnet device 100 alone coincides with the axis of the sensor magnet device 100. Thus, when the sensor magnet device 100 is fixed to the worm wheel 22, the center of mass of the sensor magnet device 100 coincides with the rotational axis of the worm wheel 22, i.e., the rotational axis of the output shaft 26. That is, the magnet fixing structure 50, which uses the connecting portions 106 arranged one after another in the circumferential direction of the sensor magnet device 100, maintains the center of mass of the sensor magnet device 100 and of the worm wheel 22.

Next, the operation of the motor 10 of the present embodiment will be described.

In the speed reducing electric motor 10, which has the sensor magnet device 100, when the motor unit 12 is driven, the worm 18 of the speed reducing gear unit 14 is rotated about its axis, so that the worm wheel 22, which is meshed with the worm 18, is rotated about its axis. Since the worm wheel 22 is fixed to the output shaft 26, the output shaft 26 is rotated integrally with the worm wheel 22 at the rotational speed (with the increased torque), which is reduced in comparison to the rotational speed of the worm 18.

At this time, the sensor magnet device 100 is rotated integrally with the worm wheel 22, so that the signal, which corresponds to the rotational position of the output shaft 26, i.e., the rotational position of the inner ring magnet 102 and of the outer ring magnet 104, is outputted from the Hall elements 44, 46 (thereby enabling the sensing of the rotational state of the output shaft 26). The controller, which is provided in the circuit board 34, controls the actuation, stop and rotational direction of the motor unit 12 based on the signal, which corresponds to the rotational position of the output shaft 26 and is received from the Hall elements 44, 46.

As described above, the sensor magnet device 100 includes the inner ring magnet 102 and the outer ring magnet 104, which are arranged coaxially along two coaxial circles, respectively. Thus, in comparison to the single ring magnet, the greater amount of information about the rotational state (rotational position) of the output shaft 26 can be sensed through the magnetic sensor 150 in the case of the sensor magnet device 100. Furthermore, in the sensor magnet device 100, the inner ring magnet 102 and the outer ring magnet 104 are connected together by the connecting portions 106. Therefore, it is possible to limit the circumferential positional deviation between the inner ring magnet 102 and the outer ring magnet 104. In this way, in the sensor magnet device 100, the relative position between the inner magnetizing pattern of the inner ring magnet 102 and the outer magnetizing pattern of the outer ring magnet 104 are maintained by the connecting portions 106. As a result, the information about the rotational state of the output shaft 26 can be more accurately sensed based on the relative position (difference) between the inner magnetizing pattern of the inner ring magnet 102 and the outer magnetizing pattern of the outer ring magnet 104.

As described above, in the case of the sensor magnet device 100 of the present embodiment, the relatively large amount of information about the rotational state of the output shaft 26 can be relatively accurately sensed by, for example, the controller through use of the magnetic sensor 150.

Furthermore, in the sensor magnet device 100, the inner ring magnet 102 is configured into the annular form, so that it is possible to maintain the position of the sensor magnet device 100 along the predetermined circle by the inner ring magnet 102 alone. Thus, the structure of the sensor magnet device 100 is relatively simple. Similarly, in the sensor magnet device 100, the outer ring magnet 104 is configured into the annular form, so that it is possible to maintain the position of the sensor magnet device 100 along the other predetermined circle by the outer ring magnet 104 alone. Thus, the structure of the sensor magnet device 100 is relatively simple. In the sensor magnet device 100, the inner ring magnet 102 and the outer ring magnet 104 are connected together by the connecting portions 106, which also serve as the components of the magnet fixing structure 50. Therefore, the entire sensor magnet device 100 can be handled as the single component.

Furthermore, in the sensor magnet device 100, the inner ring magnet 102 and the outer ring magnet 104 are overlapped with each other in the axial direction, so that the entire sensor magnet device 100 is relative thin in the axial direction. Furthermore, the connecting portions 106 are provided in this overlapped extent, so that the connecting portions 106 can be provided without axially protruding from the inner ring magnet 102 and the outer ring magnet 104.

Furthermore, in the sensor magnet device, the magnet fixing structure 50 is formed by providing the fitting hole 108 in each connecting portion 106. Thus, a non-magnetized portion (a non-continuous portion) is not formed by the fitting holes 108 in the inner ring magnet 102 and the outer ring magnet 104. Thereby, it is possible to form the continuous magnetizing pattern all around the inner ring magnet 102 and the continuous magnetizing pattern all around the outer ring magnet 104.

Furthermore, in the speed reducing electric motor 10, the center of mass of the sensor magnet device 100 coincides with the center of mass of the worm wheel 22. Thus, even when the sensor magnet device 100 and the worm wheel 22 are rotated together, the rotational balance of the worm wheel 22 and thereby of the output shaft 26 are not deteriorated. Therefore, the worm wheel 22 and the output shaft 26 can be rotated in the stable manner.

Furthermore, in the sensor magnet device 100, the magnetizing pattern of the inner ring magnet 102 and the magnetizing pattern of the outer ring magnet 104 are different from each other in the circumferential direction (rotational direction). Therefore, various types of information about the rotational state of the output shaft 26 can be sensed based on the difference between the magnetizing pattern of the inner ring magnet 102 and the magnetizing pattern of the outer ring magnet 104. Particularly, in the case of the speed reducing electric motor 10 where the Hall elements 44, 46 of the magnetic sensor 150 are arranged one after another along the imaginary straight line, which radially extends from the rotational center of the output shaft 26, i.e., where the Hall elements 44, 46 of the magnetic sensor 150 are arranged at the same phase in the rotational direction of the worm wheel 22, it is still possible to sense various types of information about the rotational state of the output shaft 26 due to the difference between the magnetizing pattern of the inner ring magnet 102 and the magnetizing pattern of the outer ring magnet 104.

Now, a procedure of fixing the sensor magnet device 100 to the worm wheel 22 of the speed reducing gear unit 14 through use of the magnet fixing structure 50 will be described in detail. First, the sensor magnet device 100 is brought toward the worm wheel 22 in the axial direction while the sensor magnet device 100 is oriented such that the end surface 102B of the inner ring magnet 102, the end surface 104B of the outer ring magnet 104 and the end surface 106A of each connecting portion 106 are opposed to the end portion 22A of the worm wheel 22.

In this process, the fixing pins 56 of the worm wheel 22 are fitted into the fitting holes 108 of the connecting portions 106 of the sensor magnet device 100 until the end surface 102B of the inner ring magnet 102, the end surface 104B of the outer ring magnet 104 and the end surfaces 106A of the connecting portions 106 contact the seat surfaces 22C of the seat portions 22B of the worm wheel 22. In this way, the fitting portions 56B of the fixing pins 56 are lightly press fitted into the fitting holes 108, respectively. Thereby, the sensor magnet device 100 is temporarily held by the worm wheel 22. Then, the toothed rings 58 are fitted to the distal end portions 56A of the fixing pins 56 by urging each toothed ring 58 against the distal end portion 56A of the corresponding fixing pin 56 in the axial direction of the fixing pin 56 (the axial direction of the worm wheel 22) until the ring portion 58A of the toothed ring 58, which receives the distal end portion 56A of the fixing pin 56 therein, is seated against the corresponding connecting portion 106.

In this way, at the magnet fixing structure 50, the unintentional removal of each fixing pin 56 from the corresponding fitting hole 108 is limited. In other words, in the installed state of the toothed ring 58 where the corresponding connecting portion 106 is clamped between the seat portion 22B of the worm wheel 22 and the toothed ring 58, movement of the toothed ring 58 relative to the worm wheel 22 is limited, and thereby movement of the sensor magnet device 100 relative to the worm wheel 22 is limited. Thus, the sensor magnet device 100 is fixed to the worm wheel 22 by the magnet fixing structure 50, so that the sensor magnet device 100 can rotate coaxially and integrally with the sensor magnet device 100.

In the magnet fixing structure 50 of the speed reducing gear unit 14, the sensor magnet device 100 is clamped between the worm wheel 22 and the toothed rings 58 to fix the sensor magnet device 100 to the worm wheel 22. Therefore, a heat treatment is not required unlike the case where heat welding is required to fix the worm wheel 22 and the sensor magnet device 100. Thus, in the magnet fixing structure 50 of the speed reducing gear unit 14, thermal deformation of the worm wheel 22 and the sensor magnet device 100, which would be caused by the heat treatment, will not occur.

In this way, in the speed reducing gear unit 14, the required dimensional accuracy of the worm wheel 22 can be achieved. As a result, the rotation of the worm 18 (the motor unit 12) can be smoothly transmitted to the output shaft 26. Furthermore, in the speed reducing gear unit 14, the required dimensional accuracy of the inner ring magnet 102 (and the magnetizing pattern thereof) and of the outer ring magnet 104 (and the magnetizing pattern thereof) of the sensor magnet device 100 is achieved. Thus, the required sensing accuracy of the rotational position of the output shaft 26 can be achieved.

Furthermore, in the speed reducing gear unit 14, since the sensor magnet device 100 can be fixed to the worm wheel 22 by the magnet fixing structure 50 without requiring the heat treatment of the sensor magnet device 100, it is possible to limit a decrease in the magnetization of the sensor magnet device 100 caused by the heat treatment. Therefore, a change in the magnetic characteristics of the sensor magnet device 100, which would be caused by the decrease in the magnetization, can be advantageously limited. Even in this way, the sensing accuracy of the rotational position of the output shaft 26 can be enhanced.

As described above, in the speed reducing gear unit 14, the rotational state of the output shaft 26 can be accurately sensed.

Furthermore, in the magnet fixing structure 50 of the speed reducing gear unit 14, the sensor magnet device 100 can be accurately fixed to the worm wheel 22 without making an excessive play by simply fitting the fixing pins 56 of the worm wheel 22 into the fitting holes 108 of the sensor magnet device 100 and by simply fitting the toothed rings 58 to the distal end portions 56A of the fixing pins 56. Particularly, since the installation direction of these components coincide with the axial direction of the worm wheel 22 (the sensor magnet device 100), the automatic assembling machine for assembling these components can be made relatively simple.

Furthermore, in the magnet fixing structure 50 of the speed reducing gear unit 14, the fixing pins 56 (the fitting portions 56B) of the worm wheel 22 are lightly press fitted into the fitting holes 108 of the sensor magnet device 100. Thus, at the time of assembling, the sensor magnet device 100 can be accurately positioned relative to the worm wheel 22 and can be provisionally held to limit the unintentional removal of the sensor magnet device 100 from the worm wheel 22. Also, since the fixing pins 56 (the fitting portions 56B) of the worm wheel 22 are lightly press fitted into the fitting holes 108 of the sensor magnet device 100, wobbling of the sensor magnet device 100 relative to the worm wheel 22 in the radial direction (direction perpendicular to the axial direction) can be limited. Furthermore, the press fitting direction of the fixing pins 56 of the worm wheel 22 against the fitting holes 108 of the sensor magnet device 100 is the same as the installation direction of each toothed ring 58 to the corresponding fixing pin 56. Thus, the sensor magnet device 100, which is in the provisionally held state, can be securely fixed to the fixing pins 56 at the time of installing the toothed rings 58 to the fixing pins 56.

Furthermore, in the speed reducing electric motor 10, which has the speed reducing gear unit 14, the rotational state of the output shaft 26 can be accurately sensed. Thus, the operation of the driven-side member (e.g., the wiper arm), which is connected to the output shaft 26, can be accurately controlled based on the sensed result, which indicates the rotational state of the output shaft 26.

In the first embodiment, the inner ring magnet 102 and the outer ring magnet 104 are both configured into the annular form. However, the present invention is not limited to this. For example, as shown in FIGS. 8A to 8D, the inner ring magnet 102 and the outer ring magnet 104 may be modified as follows. In a first modification shown in FIG. 8A, a plurality (three in this modification) of arcuate magnets 112 (serving as secondary magnet portions) is provided in place of the outer ring magnet 104 and is connected to the inner ring magnet 102 (serving as the primary magnet portion) through the connecting portions 106 to form a sensor magnet device 110.

Figure 8A:
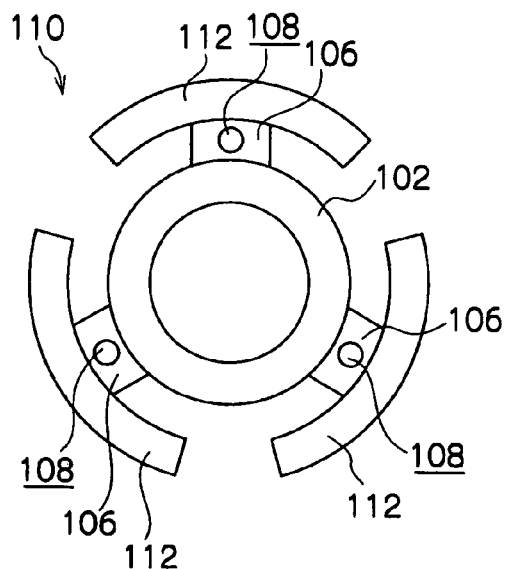
FIGS. 8A to 8D are schematic plan views sowing various modification of the sensor magnet device of the first embodiment.
Figure 8B:
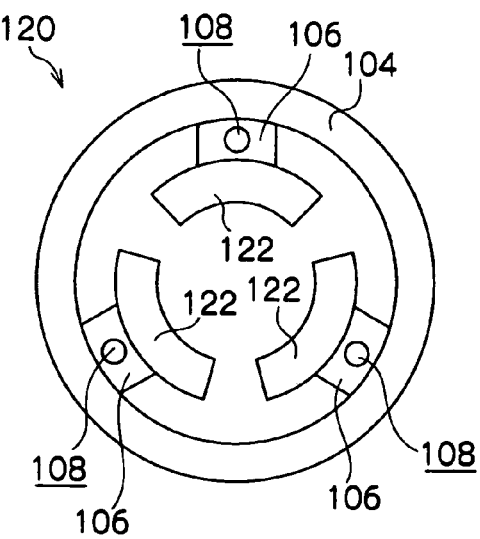

In a second modification shown in FIG. 8B, a plurality (three in this modification) of arcuate magnets 122 (serving as primary magnet portions) is provided in place of the inner ring magnet 102 and is connected to the outer ring magnet 104 (serving as the secondary magnet portion) through the connecting portions 106 to form a sensor magnet device 120.

Figure 8C:
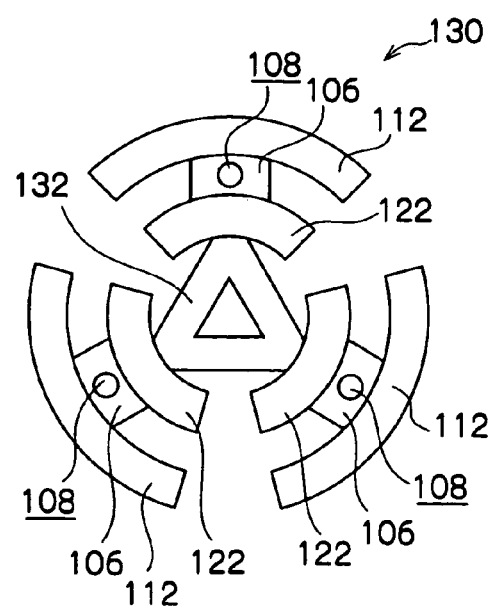

In a third modification shown in FIG. 8C, the arcuate magnets 122 (serving as the primary magnet portions) are held together by a center connecting portion 132 to have a fixed relative position thereof along a predetermined circle and are connected to the arcuate magnets 112 (serving as the secondary magnet portions) through the connecting portions 106 to form a sensor magnet device 130.

Figure 8D:
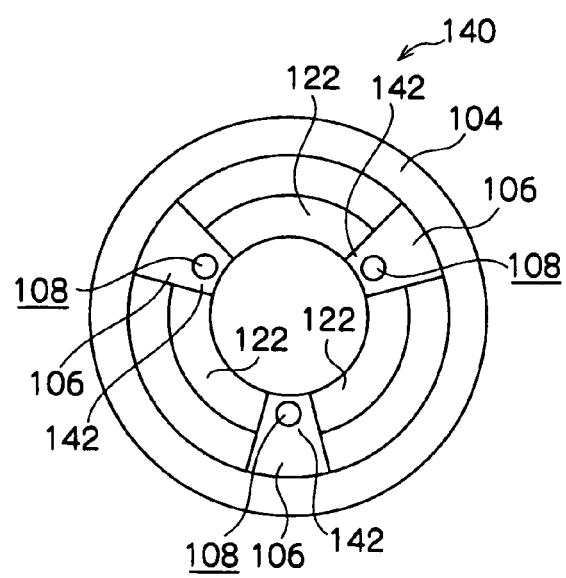

In a fourth modification shown in FIG. 8D, each adjacent two of the arcuate magnets 122 (serving as the primary magnet portions) are held together by a corresponding circumferential connecting portion 142 to have a fixed relative position thereof along a predetermined circle and are connected to the outer ring magnet 104 (serving as the secondary magnet portion) through the connecting portions 106 to form a sensor magnet device 140. In the fourth modification, the three fitting holes 108 are formed in the three circumferential connecting portions 142, respectively. In this example, the outer ring magnet 104 may be alternatively used as the primary magnet portion, and the arcuate magnets 122 may be alternatively used as the secondary magnet portions. Furthermore, in the structure of FIG. 8D, in place of the outer ring magnet 104, the arcuate magnets 112 may be provided as the secondary magnet portions.

Although not described in detail, it should be understood that besides the above exemplary modifications, any other combinations and modifications may be made within the spirit and scope of the present invention.

Furthermore, in the above embodiment and modifications, the magnets of the sensor magnet device 100, 110, 120, 130, 140 are arranged along two concentric circles. However, the present invention is not limited to such a configuration. For example, multiple magnets may be arranged along three or more concentric circles (including arcs) to form the sensor magnet device.

Furthermore, in the above embodiment and the modifications, the inner ring magnet 102, the outer ring magnet 104 and the arcuate magnets 112, 122 have generally the same axial thickness and are overlapped generally along the entire thickness. However, the present invention is not limited to this. For example, the inner ring magnet 102 (or the arcuate magnets 122) and the outer ring magnet 104 (or the arcuate magnets 112) may be axially offset from each other and may have different axial thicknesses, respectively, depending on the need. Furthermore, the connecting portions 106 are not necessarily placed in the overlapped extent, in which the inner ring magnet 102 and the outer ring magnet 104 are overlapped with each other, or in the axial thickness range of the inner ring magnet 102 or of the outer ring magnet 104.

Furthermore, in the above embodiment, the magnetizing pattern of the inner ring magnet 102 and the magnetizing pattern of the outer ring magnet 104 are different from each other such that the angular extent or size (circumferential length) of the N-pole 40N (or S-pole 102S) differs from the angular extent or size (circumferential length) of the N-pole 104N (or S-pole 104S). However, the present invention is not limited to this. For example, while keeping the angular size of the N-pole 102N generally equal to the angular size of the N-pole 104N, the N-pole 102N and the N-pole 104N may be displaced from each other in the rotational direction, so that the magnetizing pattern of the inner ring magnet 102 and the magnetizing pattern of the outer ring magnet 104 are different from each other. Alternatively, the angular size of the N-pole 102N and the angular size of the N-pole 104N may coincide with each other, and at the same time, the angular location of the N-pole 102N and the angular location of the N-pole 104N may coincide with each other. In such a case, the circumferential position of the Hall element 44 and the circumferential position of the Hall element 46 may be different from each other. Specifically, the speed reducing electric motor 10 may be constructed to have different magnetizing patterns by using the magnetic sensor 150 that has the Hall elements 44, 46, which are circumferentially spaced from each other. Furthermore, for example, at least one of the inner ring magnet 102 and the outer ring magnet 104 may have more than one N-pole 102N, 104N and/or more than one S-pole 102S, 104S to implement the different magnetizing patterns.

Second Embodiment

Next, a speed reducing gear unit (worm speed reducing apparatus) 70 according to a second embodiment of the present invention will be described with reference to FIGS. 9 to 11. Components, which are similar to those of the first embodiment, will be indicated by the same reference numerals and will not be described further.

Figure 9:
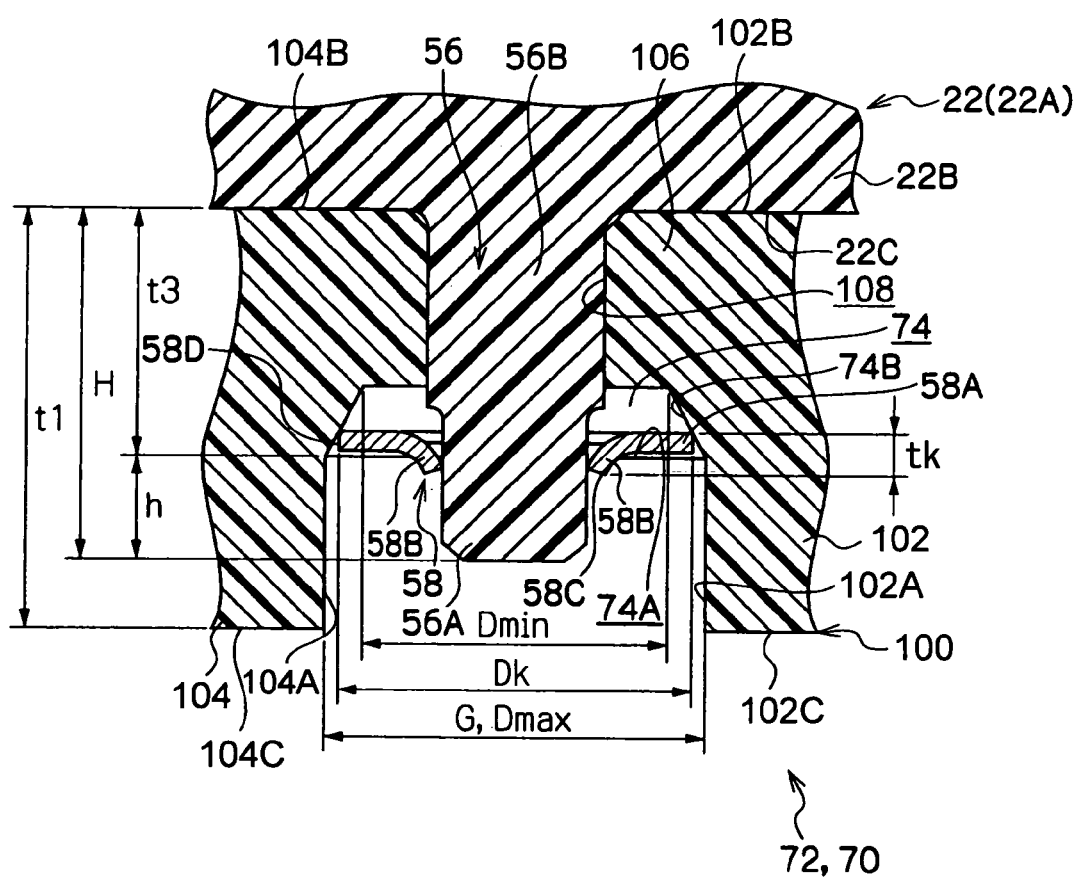
FIG. 9 is an enlarged partial cross sectional view showing a fixing structure, which fixes a sensor magnet device to a worm wheel according to a second embodiment of the present invention.
Figure 10:
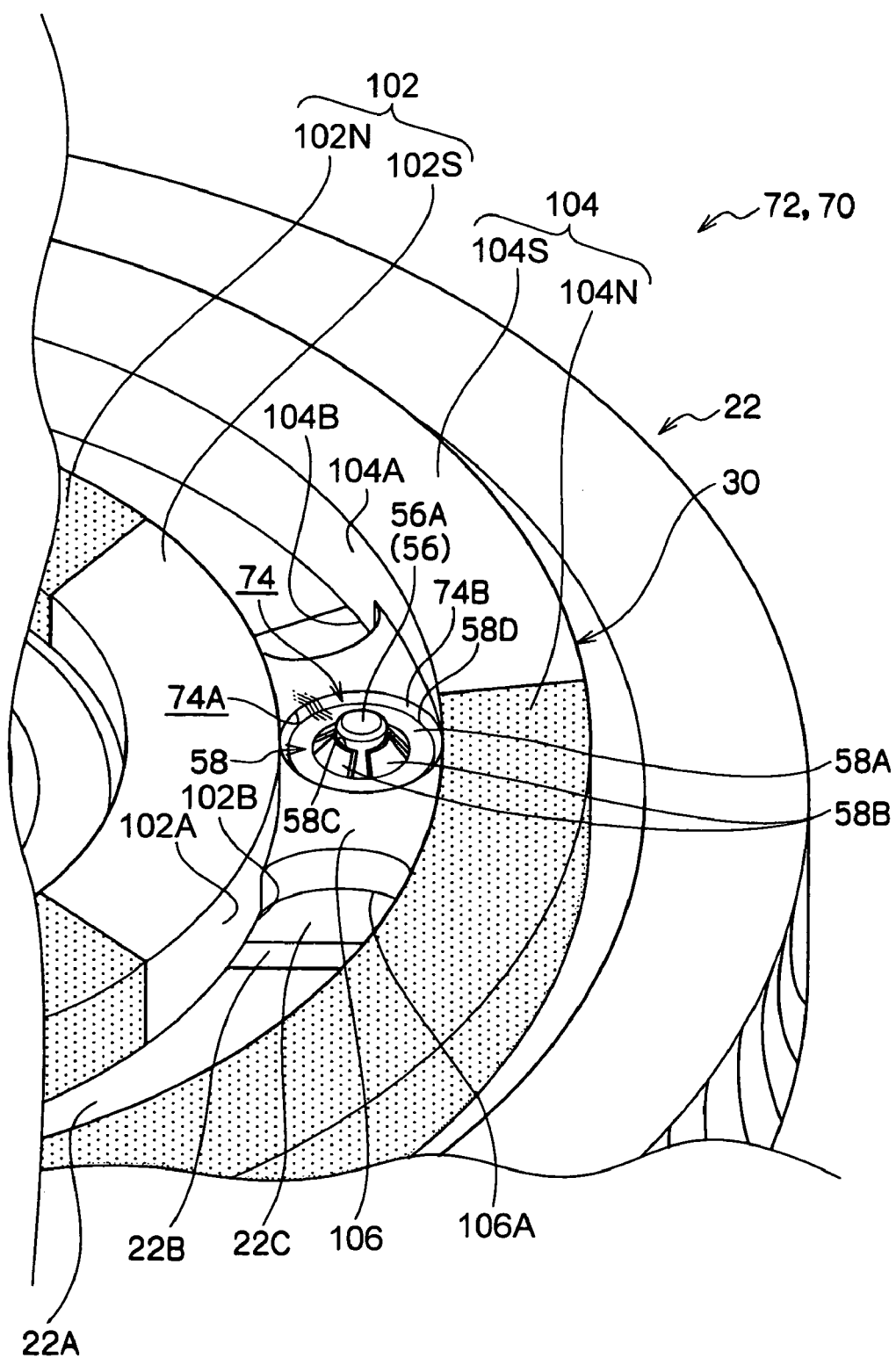
FIG. 10 is an enlarged partial perspective view showing the fixing structure, which fixes the sensor magnet device to the worm wheel according to the second embodiment.
Figure 11:
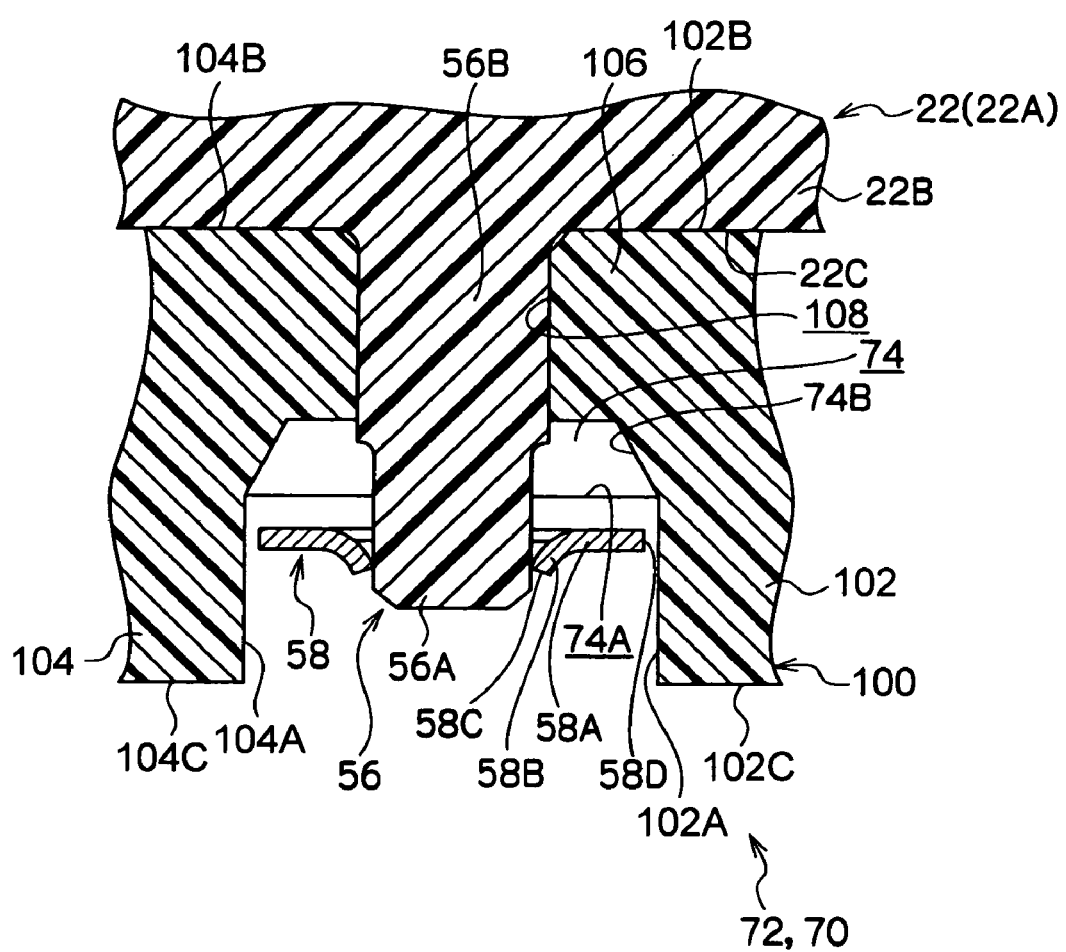
FIG. 11 is an enlarged partial cross sectional view similar to FIG. 9, illustrating a process of fitting a toothed ring according to the second embodiment.

As shown in FIGS. 9 and 10, the speed reducing gear unit 70 is different from the speed reducing gear unit 14 of the first embodiment such that the speed reducing gear unit 70 includes a magnet fixing structure 72 in place of the magnet fixing structure 50. The magnet fixing structure 72 is different from the magnet fixing structure 50 as follows. That is, in the magnet fixing structure 72, each connecting portion 106 of the sensor magnet device 100 has a tapered opening 74, which is coaxial with the corresponding fitting hole 108 and extends continuously from the fitting hole 108.

Specifically, as shown in FIG. 9, the tapered opening 74 is configured to open on the side of the connecting portion 106, which is opposite from the end surface 106A of the connecting portion 106 located on the worm wheel 22 side. An inner diameter of the tapered opening 74 continuously changes such that the tapered opening 74 has a maximum inner diameter at an opening end (a maximum diameter portion) 74A of the tapered opening 74 and a minimum inner diameter at an opposite fitting hole 108 side end of the tapered opening 74. Also, as shown in FIG. 9, the maximum inner diameter Dmax of the tapered opening 74 is set to be larger than the outer diameter Dk of the toothed ring 58, and the minimum inner diameter Dmin of the tapered opening 74 is set to be smaller than the outer diameter Dk of the toothed ring 58. Furthermore, the maximum inner diameter Dmax of the tapered opening 74 is generally the same as a gap G between the inner ring magnet 102 and the outer ring magnet 104.

Thus, the tapered opening 74 is tapered like a bowl between the outer peripheral surface 102A of the inner ring magnet 102 and the inner peripheral surface 104A of the outer ring magnet 104 to receive the toothed ring 58.

Furthermore, as shown in FIG. 9, the protruding height (the height in the axial direction of the worm wheel 22) H of the fixing pin 56 is larger than the thickness t3 of the connecting portion 106, which is a sum of the axial length of the fitting hole 108 and the axial length of the tapered opening 74. The thickness t3 of the connecting portion 106 may be set to be the same as the thickness t2 of the first embodiment. Also, the thickness t3 of the connecting portion 106 may be regarded as the sum of the thickness t2, which corresponds to the length of the fitting hole 108, and the axial length of the tapered opening 74. In other words, the fitting hole 108 and the tapered opening 74 may be considered as the through hole of the present invention. Alternatively, the fitting hole 108 alone may be considered as the through hole of the present invention.

In the second embodiment, a protruding height h of a portion of the fixing pin 56, which protrudes from the opening end 74A, is a difference between the protruding height H of the fixing pin 56 and the thickness t3 of the connecting portion 106. This protruding height h is set to be larger than an entire thickness tk of the toothed ring 58, which includes a protruding height of the tooth 58B of the toothed ring 58. More specifically, as shown in FIG. 11, the above dimensions are set such that the teeth 58B of the toothed ring 58 are engaged with the distal end portion 56A of the fixing pin 56 before the ring portion 58A of the toothed ring 58 enters into the tapered opening 74.

In the magnet fixing structure 72, as shown in FIGS. 9 and 10, an outer peripheral edge 58D of the ring portion 58A is urged (engaged) against an inner peripheral surface 74B of the tapered opening 74 in the installed state of the toothed ring 58 to the fixing pin 56. That is, in the case of the magnet fixing structure 72, the toothed ring 58 is axially urged along the fixing pin 56 until the outer peripheral edge 58D of the toothed ring 58 engages or slightly bits the inner peripheral surface 74B of the tapered opening 74. In this way, the sensor magnet device 100 is fixed to the worm wheel 22.

The rest of the structure of the magnet fixing structure 72 is the same as that of the magnet fixing structure 50 of the first embodiment. Specifically, the rest of the structure of the speed reducing gear unit 70 is the same as that of the speed reducing gear unit 14 of the first embodiment.

Therefore, the speed reducing gear unit 70 (the magnet fixing structure 72) of the second embodiment can achieve advantages similar to those of the speed reducing gear unit 14 (the magnet fixing structure 50) of the first embodiment. Furthermore, in the magnet fixing structure 72 of the speed reducing gear unit 70, the toothed ring 58 is urged against the inner peripheral surface 74B of the tapered opening 74. Therefore, wobbling of the sensor magnet device 100 relative to the worm wheel 22 in the circumferential direction (rotational direction) and also in the radial direction can be limited. Particularly, in the case where the speed reducing gear unit 70 is used in the speed reducing electric motor 10, which is rotatable in both of the forward and reverse rotational directions, the influences of the circumferential wobbling on the accuracy may possibly be two times greater than that of the one-way motor, which rotates only in a single direction. However, the speed reducing gear unit 70 of the present embodiment can advantageously limit such wobbling.

Furthermore, in the magnet fixing structure 72, the distal end portion 56A of the fixing pin 56 protrudes from the opening end 74A. Thus, as shown in FIG. 11, at the time of fixing the toothed ring 58 over the fixing pin 56, the distal end portion 56A of the fixing pin 56 can be first received into the toothed ring 58, that is, the teeth 58B of the toothed ring 58 can be engaged with the distal end portion 56A. In this received state, when the toothed ring 58 is further pressed in the axial direction of the fixing pin 56, the toothed ring 58 is securely installed to the fixing pin 56. That is, the toothed ring 58 can be smoothly urged against the inner peripheral surface 74B of the tapered opening 74 while the toothed ring 58 is guided by the fixing pin 56 at an appropriate orientation. Thus, in the magnet fixing structure 72, the toothed ring 58 can be securely installed to the fixing pin 56 while the toothed ring 58 is urged against the inner peripheral surface 74B of the tapered opening 74 at the appropriate orientation.

Figure 12:
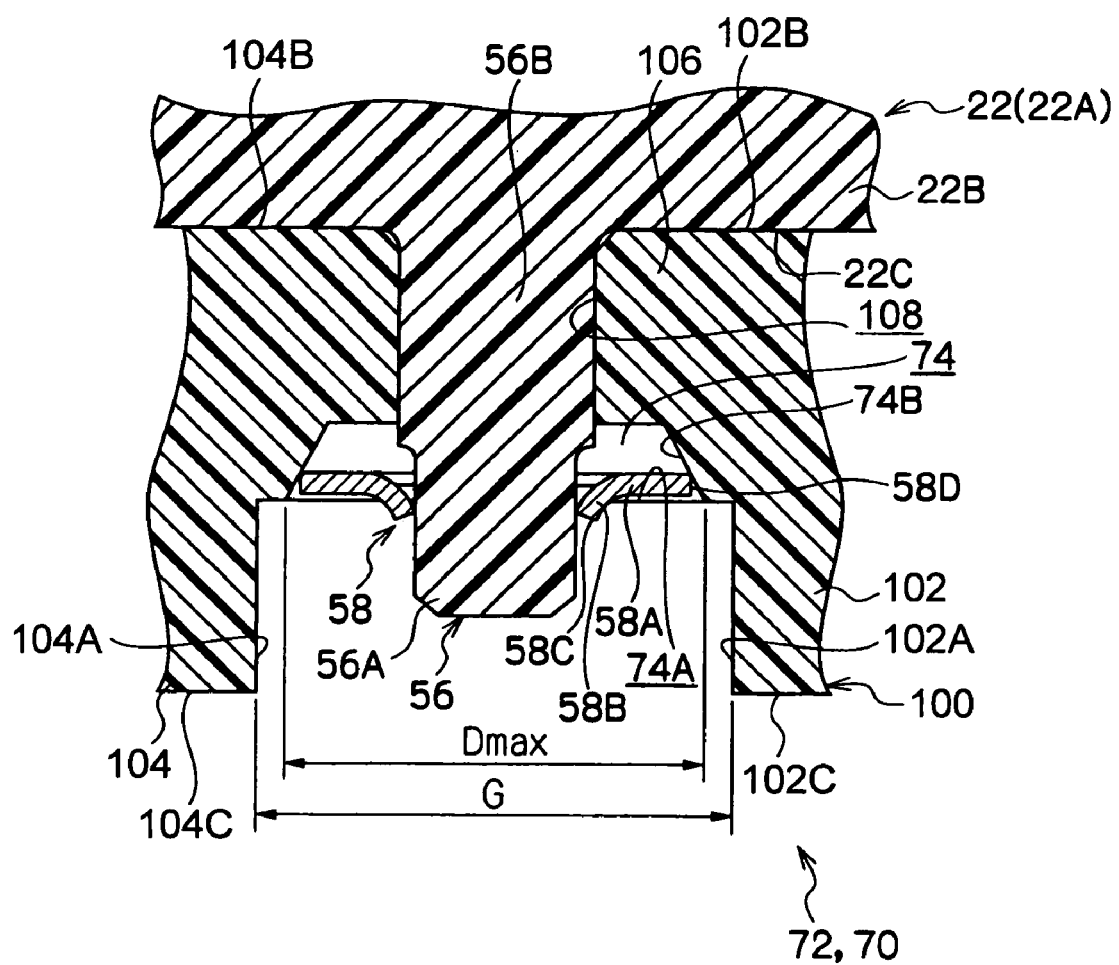
FIG. 12 is an enlarged partial cross sectional view showing a modification of the second embodiment.

In the second embodiment, the maximum inner diameter Dmax of the tapered opening 74 generally coincides with the gap G between the inner ring magnet 102 and the outer ring magnet 104. Alternatively, as shown in FIG. 12, the magnet fixing structure 72 may be construed such that the maximum inner diameter Dmax of the tapered opening 74 is set to be smaller than the gap G.

Furthermore, in the second embodiment, the outer peripheral edge 58D of the toothed ring 58 directly engages or bites against the inner peripheral surface 74B of the tapered opening 74. However, the present invention is not limited to this. For example, an intermediate component (e.g., a rubber ring) may be interposed between the outer peripheral edge 58D and the tapered opening 74.

Furthermore, in the second embodiment, the fitting holes 108 (and the associated tapered openings 74) are provided in the sensor magnet device 100, and the fixing pins 56 are provided in the worm wheel 22. However, the present invention is not limited to this. For example, at least one of the fitting holes 108 (and at least one of the associated tapered openings 74) may be provided in the worm wheel 22, and at least one of the fixing pins 56 may be provided to the sensor magnet device 100 to engage with the at least one of the fitting holes 108 (and the at least one of the associated tapered openings 74) provided in the worm wheel 22. Furthermore, in the above embodiment, the multiple fitting holes 108 (and the associated tapered openings 74) and the multiple fixing pins 56 are provided. However, the present invention is not limited to this. For example, a single fitting hole 108 (and an associated tapered opening 74) may be provided to a center of one of the worm wheel 22 and the sensor magnet device 100, and a single fixing pin 56 may be provided in a center of the other one of the worm wheel 22 and the sensor magnet device 100. In such a case, the fitting hole 108 and the fixing pin 56 may have a corresponding non-circular cross section, i.e., a relative rotation limiting cross section (such as a polygonal cross section or an oblong cross section) to reliably limit relative rotation of the sensor magnet device 100 relative to the worm wheel 22.

Furthermore, in the second embodiment, the gear mechanism of the present invention is provided as the speed reducing gear unit 14 in the speed reducing electric motor 10. However, the present invention is not limited to this. For example, any of various other speed reducing mechanisms (e.g., a spur gear train, a hypoid gear train or a sun-and-planet gear train) may be used in the speed reducing gear unit 14 of the speed reducing electric motor 10. Also, the present invention may be applied to a drive force transmitting mechanism or a speed increasing device of any other apparatus other than the speed reducing electric motor 10. Furthermore, the gear of the present invention is not limited to the final stage gear, to which the sensor magnet device 100 is fixed to directly sense the rotational state of the output shaft 26 by rotating integrally with the output shaft 26. That is, for example, the present invention may be applied to fix the sensor magnet device 100 to a first stage gear or an intermediate stage gear. Even in such a case, the rotational state of the output shaft 26 may be indirectly sensed based on a speed ratio (a rotational speed ratio) between such a gear and the output shaft 26.

Additional advantages and modifications will readily occur to those skilled in the art. The invention in its broader terms is therefore not limited to the specific details, representative apparatus, and illustrative examples shown and described. For example, any one or more of the components of the first embodiment or modifications thereof may be combined with any one or more of the components of the second embodiment or modifications thereof, if desired.

What is claimed is:

1. A gear mechanism comprising:
a gear that transmits rotation to an output shaft;
a sensor magnet device that is placed at one axial end side of the gear, wherein the sensor magnet device includes
at least one primary magnet portion that includes a magnetic material and is magnetized to have a predetermined magnetizing pattern, wherein the at least one primary magnet portion is placed along a predetermined first imaginary circle, a center of which coincides with a rotational axis of the gear,
at least one secondary magnet portion that includes a magnetic material and is magnetized to have a predetermined magnetizing pattern, which is different from the predetermined magnetizing pattern of the at least one primary magnet portion in a circumferential direction, wherein the at least one secondary magnet portion is placed along a predetermined second imaginary circle, which is coaxial with the first imaginary circle along a common axis that is coaxial with the rotational axis of the gear and has a diameter that is smaller or larger than that of the first imaginary circle, and the at least one secondary magnet portion and the at least one primary magnet portion are arranged at different radial distances from the common axis, and
at least one connecting portion that is formed integrally with and connects between the at least one primary magnet portion and the at least one secondary magnet portion, wherein
the sensor magnet device is formed such that an external magnet sensor outputs a signal corresponding to a rotational state of the output shaft based upon a sensing by the external magnet sensor of at least one of the at least one primary magnet portion and the at least one secondary magnet portion; and
a fixing means for fixing the sensor magnet device to the gear at the at least one connecting portion.

2. The gear mechanism according to claim 1, wherein the sensor magnet device is formed such that the external magnet sensor senses a magnetic pole change upon an occurrence of relative rotation between the sensor magnet device and the external magnet sensor, the external magnet sensor outputting a signal, which corresponds to the magnetic pole change.

3. The gear mechanism according to claim 1, wherein
the at least one primary magnet portion includes a single annular primary magnet portion, and the at least one secondary magnet portion includes a single annular secondary magnet portion.

4. The gear mechanism according to claim 1, wherein:
the at least one primary magnet portion is radially overlapped with the at least one secondary magnet portion; and
the at least one connecting portion connects between the at least one primary magnet portion and the at least one secondary magnet portion within a radially overlapped extent of the at least one primary and secondary magnet portions.

5. The gear mechanism according to claim 1, wherein the fixing means includes:
at least one through hole that extends through one of the gear and the sensor magnet device in an axial direction of the output shaft;
at least one fixing protrusion that protrudes from the other one of the gear and the sensor magnet device in the axial direction and is respectively received through the at least one through hole in the axial direction; and
at least one fixing element that is respectively in contact with a protruding distal end portion of the at least one fixing protrusion which respectively protrudes from the at least one through hole, so that the sensor magnet device is coaxially and integrally rotatably fixed to the gear.

6. The gear mechanism according to claim 5, wherein each of the at least one fixing element is a toothed ring, which includes:
an annular ring portion; and
a plurality of teeth, which radially inwardly protrude from an inner peripheral edge of the ring portion and are arranged one after another in a circumferential direction along the inner peripheral edge of the ring portion such that a protruding distal end portion of a corresponding one of the at least one fixing protrusions is received through the ring portion and is radially held by the plurality of teeth.

7. The gear mechanism according to claim 6, wherein:
the one of the gear and the sensor magnet device, through which the at least one through hole extends, includes at least one tapered opening;

each of the at least one tapered opening is provided to one axial end of a corresponding one of the at least one through hole, at which the protruding end portion of a corresponding one of the at least one fixing protrusions is located;

each of the at least one tapered opening is coaxial with its corresponding through hole and is tapered to have a continuously increasing diameter toward an opening end thereof; and an outer peripheral edge of the ring portion of each of the at least one fixing element is urged against an inner peripheral surface of a corresponding one of the at least one tapered opening.

8. The gear mechanism according to claim 7, wherein the distal end portion of the at least one fixing protrusion protrudes from a maximum diameter portion of its corresponding tapered opening on a side, which is opposite from its corresponding through hole.

9. The gear mechanism according to claim 5, wherein the sensor magnet device includes a plurality of ring magnets which are coaxial to the rotational axis of the gear, a first one of the ring magnets includes the at least one primary magnet portion, and a second one of the ring magnets includes the at least one secondary magnet portion.

10. The gear mechanism according to claim 9, wherein:

the plurality of ring magnets is radially spaced from each other; and the sensor magnet device further includes the at least one connecting portion, each of which connects between corresponding radially adjacent two of the plurality of ring magnets.

11. The gear mechanism according to claim 10, wherein:

the plurality of ring magnets overlaps with each other in an axial direction; and each of the at least one connecting portion connects between the corresponding radially adjacent two of the plurality of ring magnets within an axially overlapped extent thereof, in which the corresponding radially adjacent two of the plurality of ring magnets are axially overlapped with each other.

12. The gear mechanism according to claim 10, wherein the fixing means has the at least one through hole or the at least one fixing protrusion in the at least one connecting portion.

13. The gear mechanism according to claim 5, wherein the sensor magnet device is fixed to the gear such that a center of mass of the sensor magnet device coincides with the rotational axis of the gear.

14. A speed reducing electric motor comprising:

a motor unit; and a speed reducing unit that includes the gear mechanism of claim 5, wherein the gear mechanism reduces a rotational speed of rotation transmitted from the motor unit and thereafter conducts the rotation to the output shaft to drive an external driven-side member connected to the output shaft.

* * * * *